United States Patent [19]

Takimoto et al.

[11] 4,322,140
[45] Mar. 30, 1982

[54] SHUTTER OPENING ANGLE CONTROL DEVICE FOR A MOTION PICTURE CAMERA

[75] Inventors: Hiroyuki Takimoto, Urawa; Masamichi Toyama, Machida, both of Japan

[73] Assignee: Canon Kabushiki Kaisha, Japan

[21] Appl. No.: 73,434

[22] Filed: Sep. 7, 1979

[30] Foreign Application Priority Data

| Sep. 8, 1978 [JP] | Japan | 53-111066 |
| Sep. 8, 1978 [JP] | Japan | 53-111073 |
| Sep. 8, 1978 [JP] | Japan | 53-111074 |
| Sep. 8, 1978 [JP] | Japan | 53-111075 |

[51] Int. Cl.³ .......................................... G03B 21/36
[52] U.S. Cl. .................................. 352/91 C; 352/217
[58] Field of Search ............ 352/216, 217, 220, 91 R, 352/91 S, 91 C

[56] References Cited

U.S. PATENT DOCUMENTS

| 1,673,120 | 6/1928 | Oiler | 352/220 |
| 2,913,969 | 11/1959 | Faulhaber | 354/60 |
| 3,230,847 | 1/1966 | Gregory et al. | 354/60 |
| 3,295,424 | 1/1967 | Biber | 354/60 |
| 3,419,325 | 12/1968 | Mayr et al. | 352/91 S |
| 3,635,549 | 1/1972 | Stieringer | 352/91 S |

Primary Examiner—Monroe H. Hayes
Attorney, Agent, or Firm—Toren, McGeady & Stanger

[57] ABSTRACT

In the disclosed motion picture shutter angle control device, a motor serves exclusively for varying the shutter opening angle formed with a number of shutter blades. A detector detects when a predetermined shutter opening angle is obtained and delivers a signal which is used in a fade operation and the overlap operation to change the maximum opening angle.

6 Claims, 25 Drawing Figures

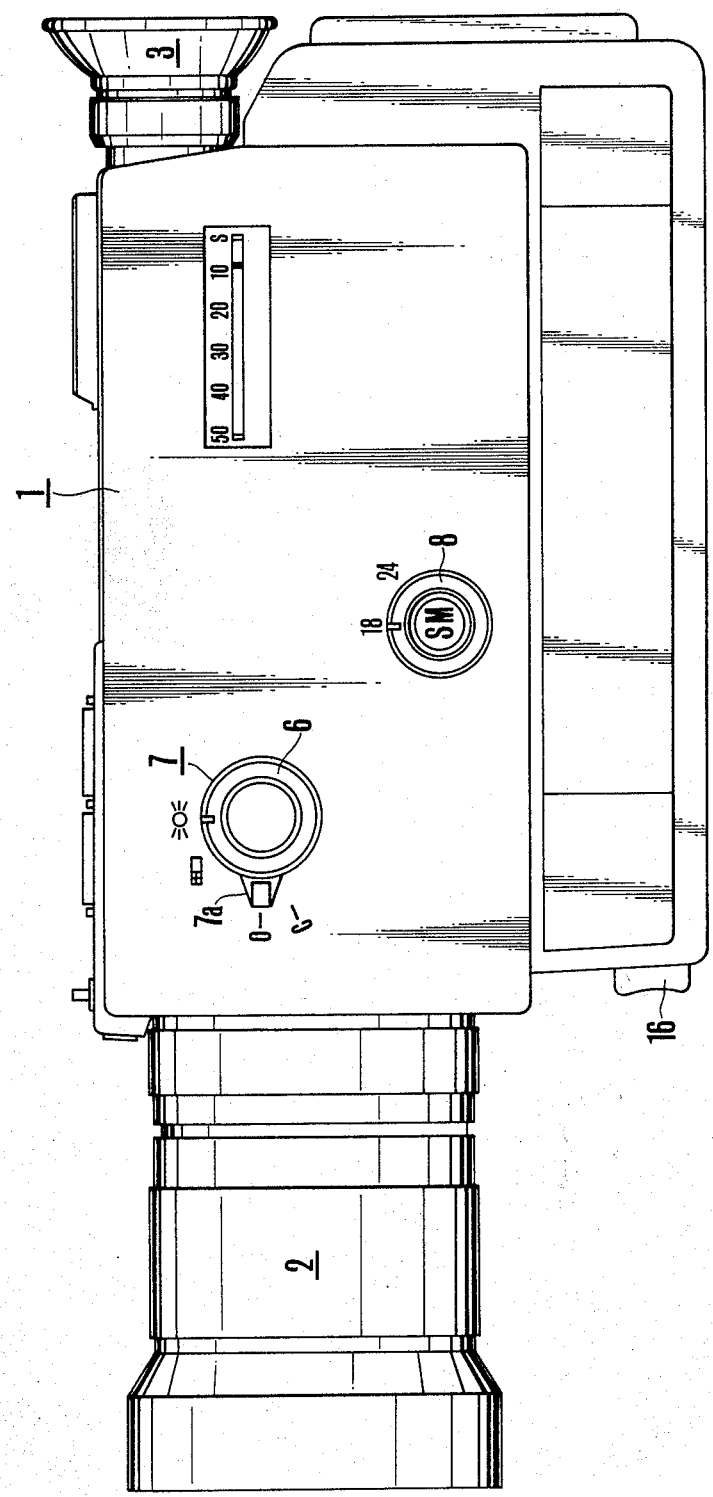

F I G. 2(a)
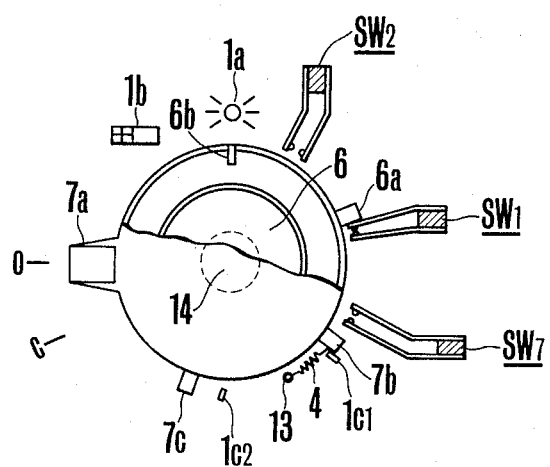
F I G. 2(b)
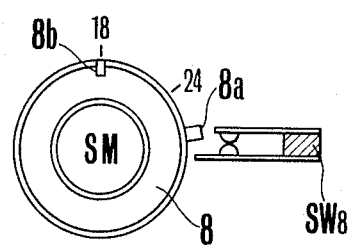

F I G. 22
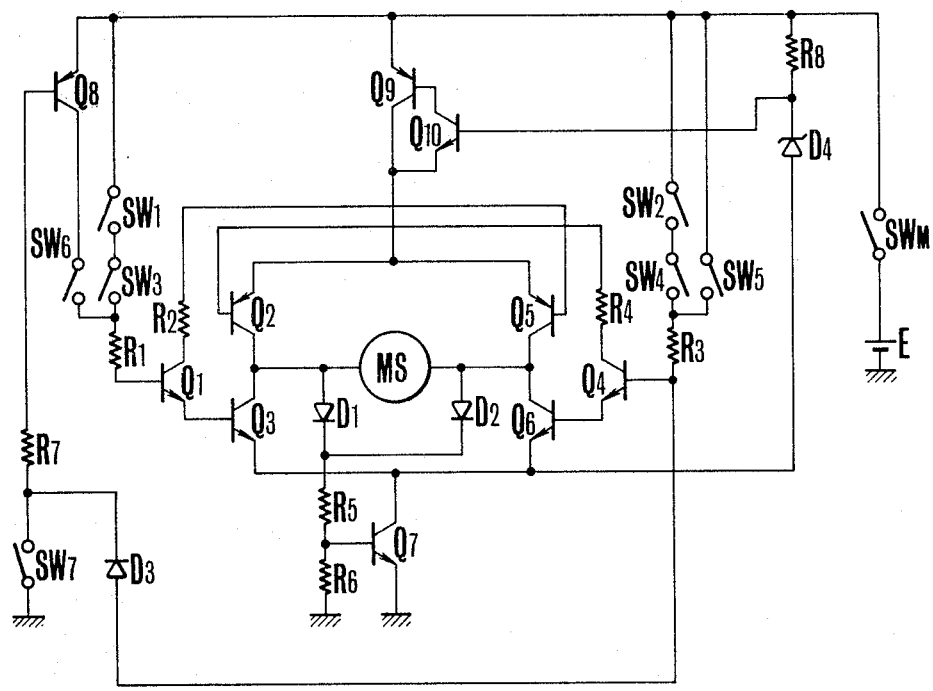

SHUTTER OPENING ANGLE CONTROL DEVICE FOR A MOTION PICTURE CAMERA

BACKGROUND OF THE INVENTION

A motion picture camera having a shutter opening angle control device permits fade in and fade out operations by varying the shutter opening angle so as either to increase or decrease the size of the sector opening.

In a conventional motion picture camera, fade in and fade out are made possible by controlling the shutter opening angle control device manually so as to vary the relative positions of a number of the shutter blades. Another known camera accomplishes these ends by generating driving power for a shutter opening angle control device from the motor that drives the film feed. However, in the former manual method, the operational speed of the shutter opening angle control is not constant and therefore a smooth fade in cannot be obtained. Moreover, the operator has to hold the camera with one hand and control the shutter opening angle which results in inconvenient operation and inferior pictures.

On the other hand, in the latter method, the shutter opening angle cannot be controlled when the camera is not being operated. Further, the construction as well as the operation are unavoidably complicated.

In accordance with another method, the shutter opening angle is selected in accordance with the photographing condition, for example, about 150° during the daylight photography and about 220° with tungsten. The operation as well as the construction becomes complicated when the above selection operation is carried out manually or by means of a conventional driving mechanism using the film feeding motor. Further, when the fade in or the fade out operation is carried out by means of a motor, the operation should be made as constant as possible.

SUMMARY OF THE INVENTION

An object of the present invention is to improve motion picture cameras.

Another object is to improve motion picture camera shutter controls.

A purpose of the present invention is to offer a shutter opening angle control device for a motion picture camera by means of which the shutter opening angle can be adjusted with a simple operation.

Another purpose of the present invention is to offer a motion picture camera shutter opening angle control device of a motion picture camera, by means of which device the maximum shutter opening angle can easily be selected by means of a switch.

Still another purpose of the present invention is to offer a shutter opening angle control device of a simple construction by means of which a fade operation can be performed smoothly.

Yet another purpose of the present invention is to offer a shutter opening angle control device for a motion picture camera in which device different fade operation speeds can be selected in accordance with the photographing speed so as to carry out overlap photography.

Still another purpose of the present invention is to offer a shutter opening angle selector control device by means of which a shutter opening angle can be set independently of the film feeding by making use of a motor exclusively for controlling the shutter opening angle.

Still another purpose of the present invention is to offer a shutter opening angle selector control device for a motion picture camera for exactly transmitting the driving power of a motor to the shutter.

Yet another purpose of the present invention is to offer a shutter opening angle changeover control device for a motion picture camera by means of which a fade operation can always be made at a constant speed regardless of the ambient temperature.

In accordance with an embodiment of the present invention, an independent motor exclusively for controlling the shutter opening angle and an output of a position detecting means for detecting the specified shutter opening angular position easily produce a predetermined opening angle.

In accordance with another embodiment of the present invention, the motor serving exclusively for controlling the shutter opening angle changeover is rotated at a constant speed, and the rotational speed of the motor can be selected in accordance with different photographing speeds. This permits a remarkably stable fade and overlap operation.

These and other features of the invention are pointed out in the claims. Other objects and advantages of the invention will become evident from the following detailed description when read in light of the accompanying drawings.

BRIEF DESCRIPTION OF THE DRAWINGS

FIG. 1 shows the exterior of a motion picture camera in accordance with the present invention.

FIGS. 2(a) and (b) respectively show in detail the shutter opening angle selector operation member and the film feeding speed setting member of the motion picture camera shown in FIG. 1 in plan view.

FIGS. 21 to 24 show embodiments of the circuit shown in FIG. 19.

DESCRIPTION OF PREFERRED EMBODIMENTS

Figure 3:
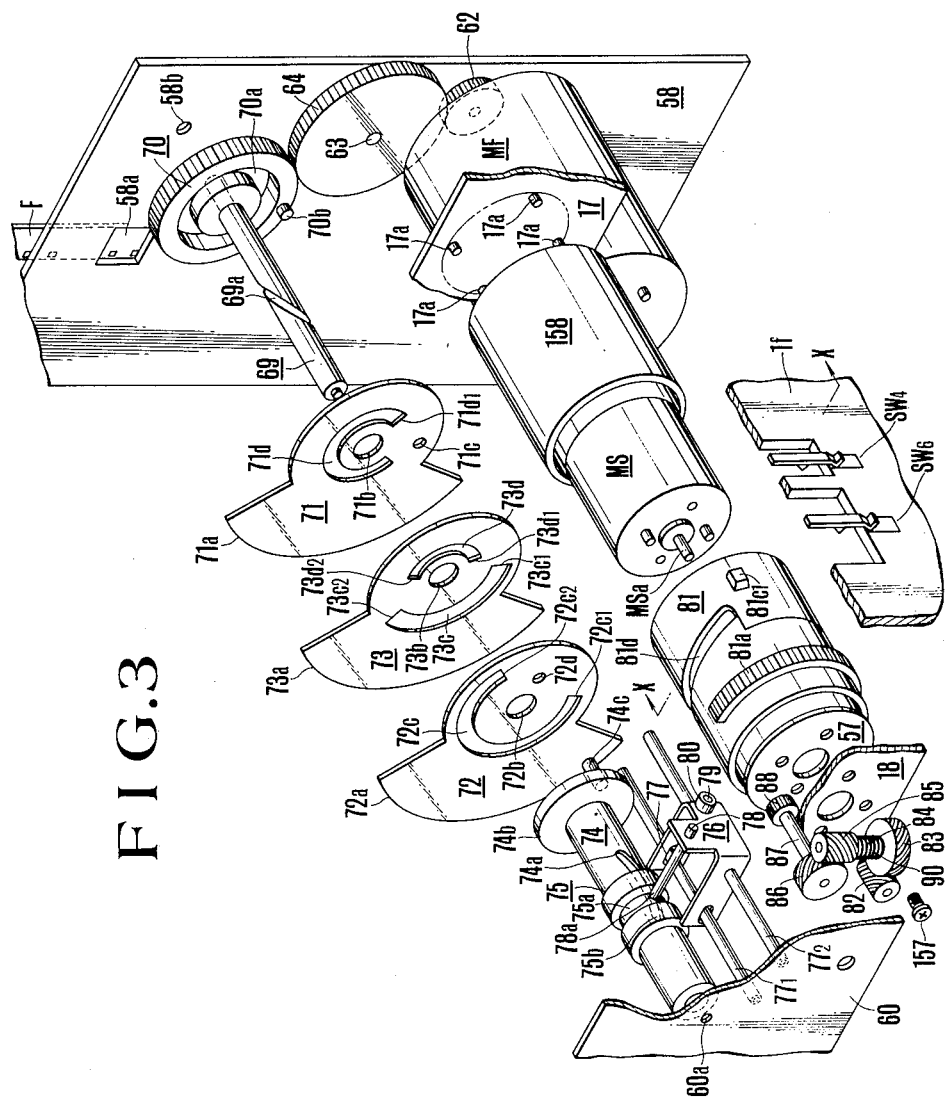
FIG. 3 is a perspective view of a first embodiment of the shutter opening angle selector operation device of the motion picture camera in accordance with the present invention.

FIGS. 1 to 16 show the construction of a motion picture camera having a shutter opening angle control device embodying the present invention. Here, a camera body 1 supports a photographing, or photographic objective, lens construction 2 at the front thereof. An eye cap 3 is secured on the viewfinder part of the camera body 1. A shutter opening angle selector operation member 6 selects the shutter opening angle between 220° and 150°. A member 7 is a fade photography operation member.

As shown in FIG. 2(a), the shutter opening selector operation member 6 and the fade photograph operation member 7 are rotatable independently on a shaft 14 secured on the camera body 1. The operation member 6 is provided with a pointer 6b and a projecting pin or piece 6a. When the pointer 6b of the operation member 6 is set at the index 1a on the exterior of the camera body 1, the projecting pin 6a pushes the normally opened switch SW1 as shown in FIG. 2. This serves to keep the switch SW1 closed. When the operation member 6 is rotated to set the pointer 6b at the index 1b, the projecting pin 6a is removed from the switch SW1, and the normally opened switch SW2 is pushed closed. Then, the switch SW1, which had been closed by the projecting pin 6a, delivers a signal to the shutter opening angle control device so as to set the shutter opening angle at 150°. Further, the switch SW2, which is now closed by the projecting pin 6a, delivers a signal to the shutter opening angle control device to set the shutter opening angle at 220°.

A fade photography control member 7 is provided with a rotary operation knob 7a and a projecting pin 7b and a projecting piece or member 7c. The operation member 7 is normally urged along clockwise by a spring 4 whose one end engages the camera body 1 and whose other end is engaged with the operation member 7. The extent of clockwise rotation of the operation member 7 is controlled by contact with an engaging member 1c₁ on the camera body 1, while the extent of counterclockwise rotation is controlled by contact with an engaging member 1c₂ on the camera body 1. When no force is applied to the operation member 7, the latter is rotated clockwise by a spring 4 so the member 7 is limited by the engaging part 1c₂. In this poisition, the knob 7a of the operation member 7 aligns with the mark "0" provided on the exterior of the camera body 1.

When an operator pushes the knob 7a of the operation member 7 with a finger, so as to rotate the operation member 7 into the position corresponding to the mark "0", the projecting piece or member 7c is engaged with the engaging member 1c₂ while the normally opened switch SW7 is closed by the projecting member or pin 7b. When the force upon the knob 7a of the operation member 7 is released, the operation member 7 is rotated clockwise by the spring 4 in such a manner that the knob 7a is brought back to the position opposite the mark "0". Then, the normally opened switch SW1, which has been closed by means of the operation member 7, delivers a fade out signal to the fading device.

FIG. 2(b) shows an example of the internal construction of the dial 8 for setting speed of the film feed. A film feed speed changeover means or selector 8 is provided with a pointer 8b, and a projecting piece or member 8a. When the pointer 8b of the operation member 8 is set at the index "24" on the exterior of the camera body, the normally closed switch SW8 is pushed open by the projection member 8a.

FIG. 3 shows an embodiment of the shutter opening angle selector control device in accordance with the present invention, in perspective. Here, the maximum shutter opening angle is fixed at 220°. A first base plate 58 is secured in front of the cassette loading chamber of the camera body 1, and forms an aperture 58a at a position corresponding to the aperture of the light shading gate plate. A second base plate 60 is secured on the camera body 1 opposite the first base plate 58. A film feeding motor MF secured on the camera body to rotate forwards as well as backwards serves to rotate the gear operatively secured on the output shaft of the motor MF through the friction mechanism. A gear 64 secured on the rotation shaft 63 and rotatably born on the base plate 58 is normally in engagement with the gear 62. A shutter main shaft 69 whose one end is rotatably supported in a hole 58b in the first base plate 58 and whose other end is rotatably supported in a hole 60a of the base plate 60 is formed with a spiral groove 69a therein. A gear 70 is secured on the shutter main shaft 69. The gear 70 is formed with a ring-shaped groove 70a on its face opposite the second base plate 60 and carries a pin 70b projecting toward the second base plate. Here, the gear 70 normally engages the gear 64 so as to be rotated by the driving force of the motor MF through the gears 62 and 64. The gear 70 is also engaged with a gear not shown in the drawing, which serves to transmit the driving power of the motor MF to the film feeding mechanism for feeding the film at the film gate. Shutter blades 71, 72 and 73 possess respective shutter sectors 71a, 72a and 73a. Blade 71 is the main shutter blade, 72 is the first auxiliary shutter blade and 73 is the second auxiliary shutter blade. Here, the circular angle of the shutter parts 71a, 72a and 73a of the shutter blades 71, 72 and 73 are chosen to be slightly larger than 120°. The center of the shutter blades 71, 72 and 73, form holes 71b, 72b and 73b.

Now, let us assume a first imaginary circle with a radius "D" having a center at the holes 71b, 72b and 73b and a second imaginary circle with a radius "d" having the center at the holes 71b, 72b and 73b on the shutter blades 71, 72 and 73. The main shutter blade 71 has a hole 71c on the first imaginary circle and a long hole 71d along the second imaginary circle. The first auxiliary shutter blade 72 has a long hole 72c along the first imaginary circle and a hole 72d on the second imaginary circle. The second auxiliary shutter blade 73 is formed with a long hole 73c along the first imaginary circle and a long hole 73d along the second imaginary circle. The pin 70b on the gear 70 penetrates the hole 7c of the main shutter blade 71, the long hole 73c of the second auxiliary shutter blade 73 and the long hole 72c of the first auxiliary shutter blade 72. Hence, the main shutter blade 71 is in the fixed relation to the gear 70 through the engagement of the pin 70b in the hole 71c. The auxiliary shutter blades 72 and 73 are respectively rotatable relative thereto because of the long holes 72c and 73c.

A cylindrical shutter shaft 74 surrounds the main shutter shaft 69 and is rotatable around the shaft 69 but unmovable along the axial direction. The auxiliary shutter shaft 74 has a spiral groove 74 whose inclination is reversed to that of the spiral groove 69a formed on the main shutter shaft 69. The end facing the first plate 58 carries a flange 74b and the surface of the flange 74b facing the second base plate 58 supports a pin 74c projecting toward the second base plate 58. The pin 74c extends into the groove 70a through the hole 72d in the first auxiliary shutter blade 72 provided between the flange part 74b of the auxiliary shutter shaft 74, the long hole 73d in the second auxiliary shutter blade 73 and the long hole 71d in the main shutter blade 71.

A shutter opening angle adjusting cylinder 75 on the auxiliary shutter shaft 74 slides rotatably and axially on the auxiliary shutter shaft 74 and exhibits an endless groove 75a on its external surface. Here, a pin 75b penetrates the spiral groove 74a of the auxiliary shutter shaft 74 so as to engage the spiral groove 69a of the main shutter shaft 69 in such a manner that the adjusting cylinder 75, the main shutter shaft 69 and the auxiliary shutter shaft 74 are rotated in unison by the pin 75b.

When the adjusting cylinder 75 is axially moved along the auxiliary shutter shaft 74, the main shutter shaft 69 and the auxiliary shutter shaft 74 are rotated in the reverse direction against each other by the pin 75b in the spiral grooves 74a and 69a. A slide member 76 is slidable along a pair of guide bars $77_1$ and $77_2$ secured between the first base plate 58 and the second base plate 60. The guide bars $77_1$ and $77_2$ are arranged almost parallel to the main shutter shaft 69. A pin 78 is secured on the slide member 76. Its free end 78a is is loosely engaged in the endless groove 75a of the adjusting cylinder 75. Consequently, when the slide member 76 is moved by means of the guide bars $77_1$ and $77_2$, the adjusting cylinder 75 is also moved on the auxiliary shutter shaft 74 by means of the pin 78. However, when the adjusting cylinder 75 is rotated together with the main and the auxiliary shutter shafts 69 and 74, the pin 78 does not influence the rotation.

A shaft 79 is secured on the slide member 76 so as to project in the direction opposite the adjusting cylinder 75, while a rotary ring 80 is rotatably borne by the shaft 79. The apparatus includes a shutter opening angle adjusting motor M, a plate-shaped spacer 57 for preventing the electrical noise, a cam ring 81, and a cylindrical member 158 for preventing electrical noise between the cam ring 81 and the motor MS. Two motor holding plates 17 and 18 are secured to the camera body 1. The motor MS is secured on the motor holding plate 18 through a spacer 57, while the plate 17 includes projections 17a at positions along the inside of the cylindrical member 158. The outer diameter of the spacer 57 is chosen equal to or a little smaller than the internal diameter of the member 158. The cylindrical member 158 is rotatably carried by the external end surface of the spacer 56 and the projections 17a, while the cylindrical member 158 and the cam ring 81 are fixedly connected to each other so as to be rotated in unison. The motor MS is secured on the motor holding plate 18 by means of a screw 157 through the spacer 57.

Figure 13:
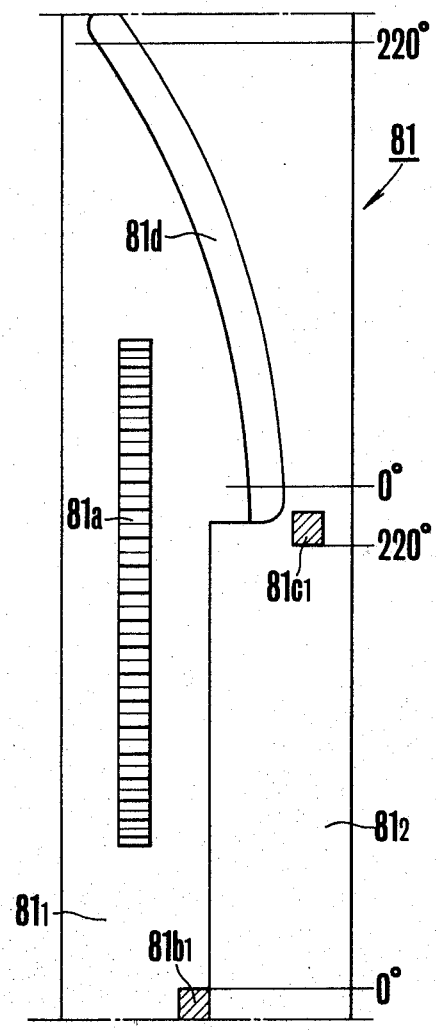
FIG. 13 shows a development of the cam ring 81 shown in FIG. 3 in plan view.
Figure 14:
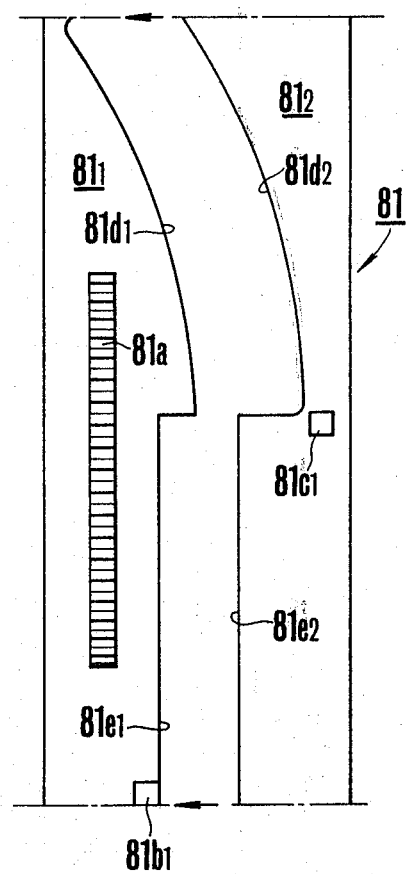
FIG. 14 shows the forming method of the cam ring 81 shown in FIG. 13.

As shown in FIGS. 3 and 13, the cam ring 81 is provided with a cam or slot 81d in which the rotary ring 80 is freely movable, gear teeth 81a, a first switch control projection $81c_1$ and a second switch control projection $81c_1$. As shown in detail in FIG. 14, the cam ring 81 is formed of a first cam ring portion $81_1$ and a second cam ring portion $81_2$. A surface $81e_1$ of the first cam ring portion $81_1$ and the surface $81e_2$ of the second cam ring portion $81_2$ are cemented to each other so as to form a cam ring 81 as shown in FIG. 13. The reason why the cam ring 81 is formed this way is to improve the forming accuracy of the cam hole 81d, while simplifying the moulding of the cam faces $81d_1$ and $81d_2$. As illustrated in FIGS. 2 to 4 and 12, a worm gear 82 is mounted on the output shaft of the motor MS and continuously engages a worm wheel 83 secured on a shaft 84. The latter is rotatably borne on the camera body 1 and carries a worm gear 85. The worm wheel 83 and the worm gear 85 are operatively engaged through a spring 90. A gear 86 secured on a shaft 87 rotatably borne on the holding plate 18, normally engages the gear 85. Secured on a rotary shaft 86 is a gear 88 normally in engagement with the gear teeth 81a of the cam ring 81. The gears 82, 83, 85, 86, 88 and 81a and the rotary shafts 84 and 87 form a reduction mechanism.

The driving power of the motor MS is transmitted to the cam ring 81 through the reduction mechanism so as to rotate the cam ring 81 over the circumference of the motor MS together with the member 158. When the cam ring 81 is driven by means of the motor MS in the afore-mentioned way, the longitudinal length of the opening angle adjusting mechanism can be made remarkably small.

Two normally closed switches SW6 and SW4 are secured on the camera body 1f at the position at which they can be controlled by means of the projections $81b_1$ and $81c_1$ of the cam ring 81. Thus, the opening angle of the shutter consisting of the shutter blades 71, 72 and 73 is controlled with the rotary translation of the cam ring 81 driven with the motor MS. Specifically, the shutter blade 71 is fixed on the gear 70 through the pin 70b while the auxiliary first shutter blade 72 is fixed on the first auxiliary shutter shaft 74 through the pin 74c. The second auxiliary shutter blade 73 is not fixed to the auxiliary shutter shaft 74 nor to the main shutter shaft 69. However, when the slide member has been translated to the leftmost side in FIG. 3 by engagement of the rotary ring 80 with the cam hole 81d of the cam ring 81, the switch SW4 is opened and the switch SW6 is closed by the switch control projections $81b_1$ and $81c_1$.

Figure 7:
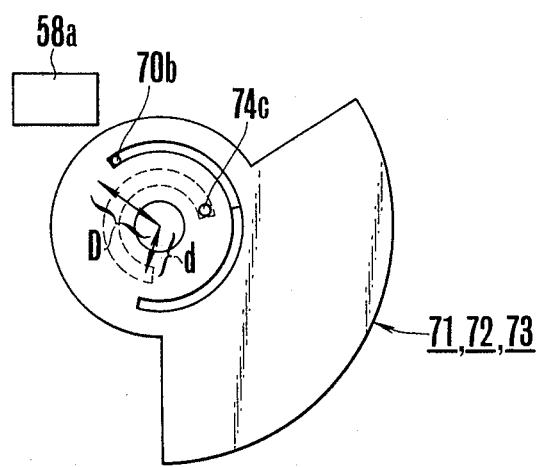
Figure 8:
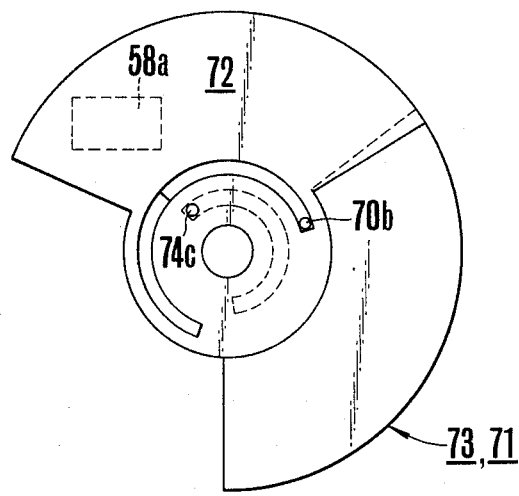

In this state, as shown in FIGS. 3 and 7, the pin 70b is in engagement with the hole 71c in the main shutter blade 71 and in contact with the one end $73c_1$ of the long hole 73c of the second auxiliary shutter blade 73 and the end $72c_1$ of the long hole 72c of the first auxiliary shutter blade 72. Further, the pin 74c is in contact with the end $73d_1$ of the long hole 73d in the second auxiliary shutter blade 73, the end $71d_1$ of the long hole 71d in the main shutter blade 71 and engaged with the hole 72d in the first auxiliary shutter blade 72. Hence, under these circumstances, the three shutter blades 71, 72 and 73 almost completely overlap each other so that the shutter opening angle is maximum, namely, about 220°. Also, the motor MS is rotated by a means to be explained later so that the cam ring 81 is rotated counterclockwise in FIG. 3 until the switch SW4 is closed.

At the same time, the slide member 76, which is controlled by means of the cam groove 81d on the cam ring 81, is gradually translated toward the first base plate 58. Along with this translation, the adjusting cylinder 75 is moved on the auxiliary shutter shaft 74 toward the first base plate 58. Upon movement of the adjusting cylinder 75 toward the first base plate 58, the auxiliary shutter shaft 74 starts to rotate counterclockwise toward the main shutter shaft 69 in FIG. 3. This occurs due to the engagement of the adjusting cylinder 75, the spiral groove 74a of the auxiliary shutter shaft 74 and the spiral groove 69a of the main shutter shaft 69 by means of the pin 75b of the adjusting cylinder 75. Thus, the first auxiliary shutter blade 72 rotates counterclockwise relative to the main shutter blade 71 and the second auxiliary shutter blade 73 so as to gradually decrease the shutter opening angle. In this way, the relative position of the first auxiliary shutter blade 72 to the main shutter blade 71 is varied, the cam ring 81 is rotated until the opening angle of the shutter reaches 220°, the pin 74c of the auxiliary shutter shaft 74 assumes the position at which the pin 74c is in contact with the other end $73d_2$ of the long hole 73d in the second auxiliary shutter blade 73 (FIG. 8) and the auxiliary shutter shaft 74 rotates along the counterclockwise direction, when the second auxiliary shutter blade 71 is pulled by means of the pin 74c and the first auxiliary shutter blade 72 and the second auxiliary shutter blade 73 rotate relative to the main shutter blade 71 so as to further decrease the opening angle of the shutter blade.

Figure 6:
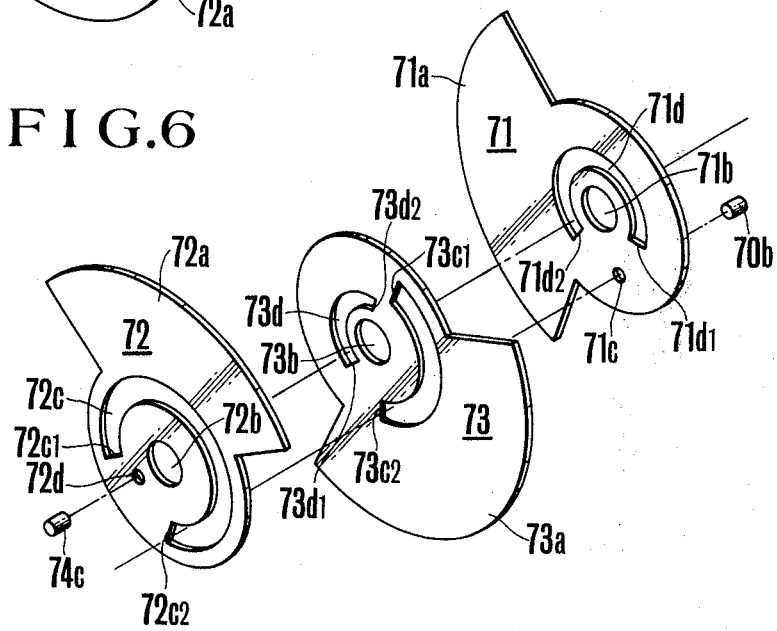
Figure 9:
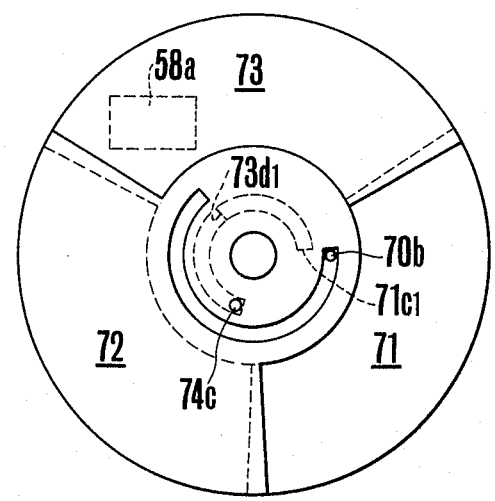
Figure 10:
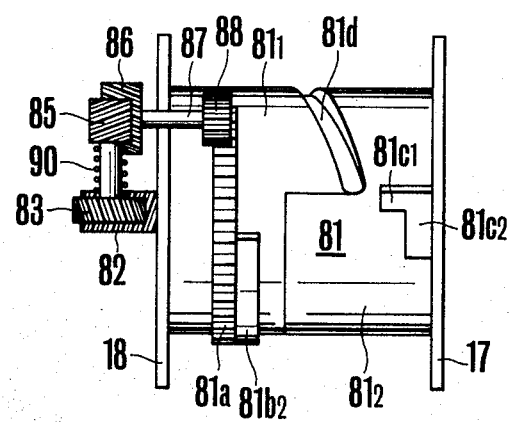
FIG. 10 shows the exterior of the driving mechanism of the shutter opening angle selector device shown in FIG. 4 in plan view.
Figure 11:
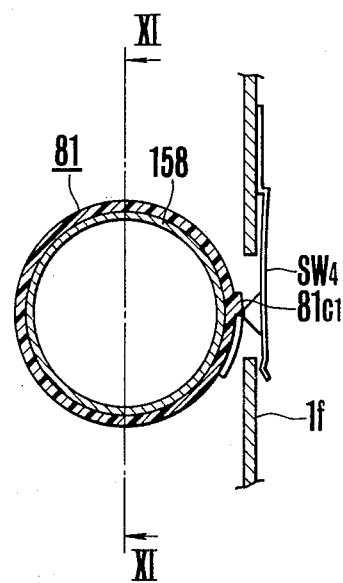
FIG. 11 shows a section along X—X of FIG. 3.
Figure 12:
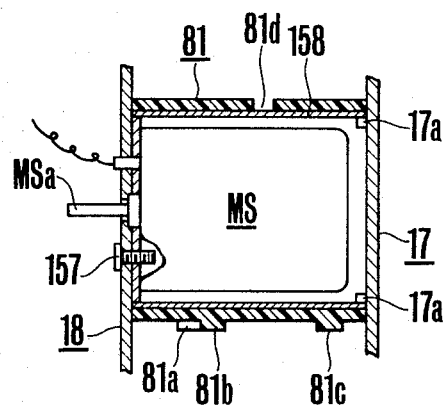
FIG. 12 shows a section along XI—XI of FIG. 11.

When at last the pin 70b on the gear 70 comes in contact with the other end $72c_2$ of the long hole 72c in the first auxiliary shutter blade 72 and that $73c_2$ of the long hole 73c in the second auxiliary shutter blade 73, the shutter is totally closed as is shown in FIGS. 6 and 9. In this condition, the adjusting cylinder 75 assumes a position closes to the first plate 58. Also, in this condition, the switch SW6 is open, while the switch SW4 is closed. That is, the fade out operation is completed.

In order to produce a fade in operation opposite to the above fade in operation, the motor MS is rotated in the reverse direction. Rotation of the motor MS rotates the cam ring 81 clockwise, starting from the total closing of the shutter when the cam ring 81 has been rotated maximally counterclockwise and the adjusting cylinder 75 has been translated maximally toward the first base plate 58, the switches SW6 and SW4 are brought in the closed state. Rotation of the cam ring 81 clockwise moves the slide member 76 gradually toward the second plate 60 due to the engagement of the rotary ring 78 with the cam 81d. The adjusting cylinder 78 is also translated on the auxiliary shutter shaft 74 toward the second plate 60. Along with the translation of the adjusting cylinder 75 toward the second plate 60, the auxiliary shutter shaft 74 is rotated clockwise relative to the main shutter shaft 69. Rotation of the auxiliary shutter shaft 74 clockwise gradually rotates the first auxiliary shutter blade 72 clockwise relative to the second auxiliary shutter blade 73 and the main shutter blade 71 so as to increase the opening angle of the shutter.

Then, when the pin 74c of the auxiliary shutter shaft 74 comes into contact with the other end $73d_1$ of the long hole 73d in the second auxiliary shutter blade 73 so as to further rotate the auxiliary shutter shaft 74 clockwise, the second auxiliary shutter blade 73 is pulled by the pin 74c and the first and the second auxiliary shutter blades 72 and 73 are rotated relative to the main shutter blade 71. This further increases the opening angle of the shutter. When the increase of the opening angle of the shutter the main shutter blade 71 results in the first auxiliary shutter blade 72 and the second auxiliary shutter blade 73 just overlapping and the opening angle of the shutter reaches 220°, the switch SW6 is closed, while the switch SW4 is open. That is, the fade in operation is completed. The above describes the mechanical construction of a first embodiment of the shutter opening changeover control device for a motion picture camera in accordance with the present invention.

Figure 4:
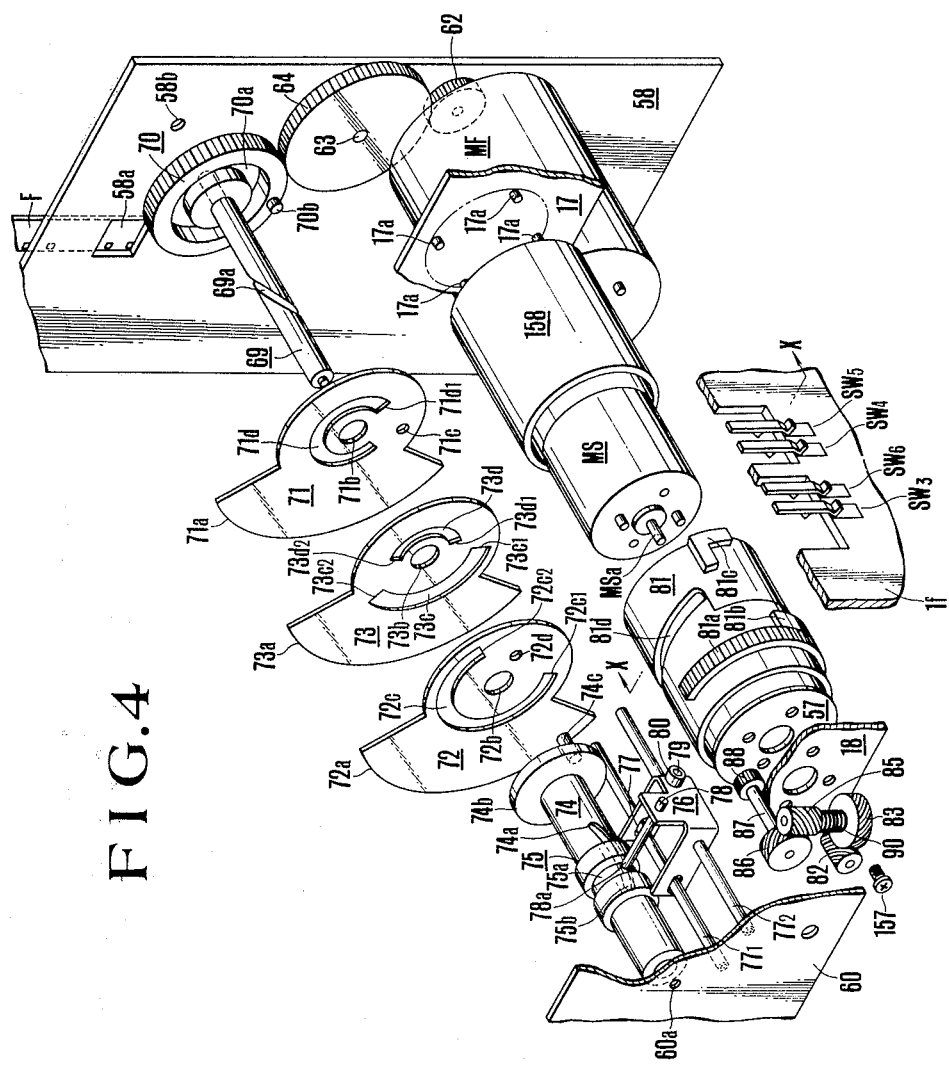
FIG. 4 is a perspective view of a second embodiment of the shutter opening angle selector operation device of the motion picture camera.
Figure 5:
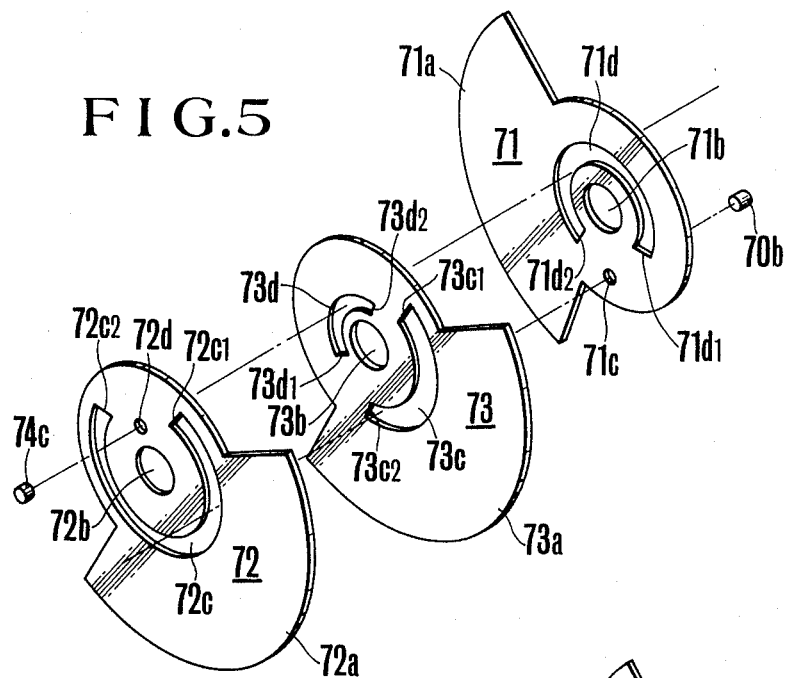
FIGS. 5 to 9 show the operations of the shutter blades whose opening angle is controlled by means of the shutter opening angle selector devices shown in FIGS. 3 and 4.

FIG. 4 shows the second embodiment of the shutter opening angle changeover control device for a motion picture camera in accordance with the present invention in perspective view. In comparison with the first embodiment, the second embodiment is designed so that the maximum opening angle at the fade in and fade out operation can be changed by means of the opening angle changing means 6. Here, the members represented by the same figures as those in FIG. 3 are the same members.

Figure 15:
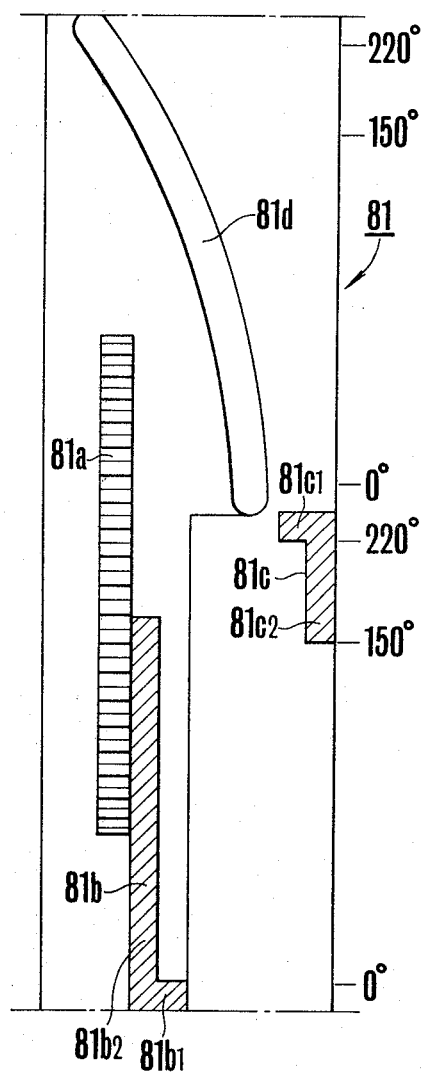
FIG. 15 shows the development of the cam ring 81 shown in FIG. 4 in plan view.
Figure 16:
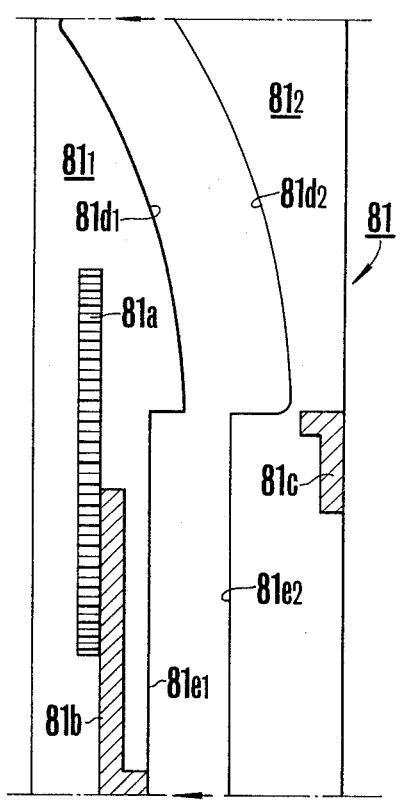
FIG. 16 shows the forming method of the cam ring 81 shown in FIG. 15.

As shown in FIG. 15, in this embodiment. the cam ring 81 carries the projections $81b_2$ and $81c_2$ close to the projections $81b_1$ and $81c_1$. Moreover, normally closed switches SW3 and SW5 are opened by the projections at certain positions.

In the second embodiment, when the slide member 76 has been translated at the left end in FIG. 4, due to the engagement of the rotary ring 80 in the cam hole 81d in the cam ring 81, the switches SW4 and SW5 are opened and the switches SW3 and SW6 are closed by the second switch control projections $81c_1$ and $81c_2$. This is shown in FIGS. 4 and 7, where the pin 70b is engaged in the hole 71c in the main shutter blade 71 and in contact with the end $73c_1$ of the long hole 73c in the second auxiliary shutter blade 73 and the end $72c_1$ of the long hole 72c in the first auxiliary shutter blade 72. At the same time, the pin 74c is engaged in the hole 72d in the first auxiliary shutter blade 72 and in contact with the one end $73d_1$ of the long hole 73d in the second auxiliary shutter blade 73 and that $71d_1$ of the long hole 71d in the main shutter blade 71. In this state, the three shutter blades 71, 72 and 73 almost completely overlap and the opening angle of the shutter is maximum, namely, about 220°.

When, the motor MS rotates the cam ring 81 counterclockwise in FIG. 4, the switch SW4 is closed soon while only the switch SW5 remains opened. At the same time, the slide member 76 is gradually moved by the cam groove 81d on the cam ring 81 toward the first base plate 58. The adjusting cylinder 75 is also moved on the auxiliary shutter shaft 74 toward the first base plate 58. Translatory movement of the adjusting cylinder 75 toward the first base plate 58 starts counterclockwise rotation of the auxiliary shutter shaft 74 in FIG. 4 relative to the main shutter shaft 69. This is caused by engagement of the adjusting cylinder 75, the spiral groove 74a in the auxiliary shutter shaft 74 and the main shutter shaft 69a by means of the pin 75b on the adjusting cylinder 75. Thus, the first auxiliary shutter blade 72 rotates alone, in the counterclockwise direction, relative to the second shutter blade 73 and the main shutter blade 71. This serves to decrease the opening angle of the shutter.

When the cam ring 81 has rotated and caused the opening angle of the shutter to reach 150° by varying the position of the first auxiliary shutter blade 72 relative to the main shutter blade 71 in this way, the switch SW3 is opened by portion $81b_2$ of the first switch control projection 81. Hence, the switch SW5 is opened, while the switches SW4 and SW6 are closed. When the cam ring 81 has rotated further, and pin 74c of the auxiliary shutter shaft 74 contacts the other end $73d_2$ of the long hole 73d of the second auxiliary shutter blade 73 (FIG. 6) and the auxiliary shutter shaft 74 even further rotates counterclockwise, the switches SW5, SW4 and SW6 close and the switch SW3 opens. At the same time, the second auxiliary blade 73 is pulled by the pin 74c and the first and the second auxiliary shutter blades 72 and 73 are rotated relative to the main shutter blade 71 so as further to decrease the opening angle of the shutter blade.

When the pin 70b on the gear 70 has at last come into contact with the other end 72c₂ of the long hole 72c in the first shutter blade 72 and that 73c₂ of the long hole 73c in the second shutter blade 73, the shutter is totally closed as is shown in FIGS. 6 and 9. In this condition, the adjusting cylinder 75 assumes a position closest to the first base plate 58. Further, in this condition, the switches SW3 and SW6 are opened, while the switches SW4 and SW5 are closed. The fade out operation is now completed.

In order to carry out a fade in operation, the motor MS is reversed relative to the fade out operation. The cam ring 81 is now rotated clockwise by reverse rotation of the motor MS from the position of the total closing of the shutter where the cam ring 81 has been maximally rotated counterclockwise. Clockwise rotation of the cam ring 81 gradually translates the slide member 76 toward the second base plate 60 due to the engagement of the rotary ring 80 with the cam 81d. The adjusting cylinder 75 is also translated on the auxiliary shutter shaft 74 toward the second base plate 60. Movement of the adjusting cylinder 75 toward the second base plate 60 rotates the auxiliary shutter shaft 74 clockwise relative to the main shutter shaft 69. This clockwise rotation of the auxiliary shutter shaft 74 gradually rotates the first auxiliary shutter blade 72 clockwise relative to the second auxiliary shutter blade 73 and the main blade 71, and hence, increases the opening angle of the shutter.

When the pin 74c of the auxiliary shutter shaft 74 has come into contact with the other end 73d₁ of the long hole 73d in the second auxiliary shutter blade 73 and the auxiliary shutter shaft 74 is rotated clockwise, the second auxiliary shutter blade 73 is pulled by the pin 74 so that the first and second auxiliary shutter blades 72 and 73 are rotated relative to the main shutter blade 71. This serves further to increase the opening angle of the shutter. When the opening angle of the shutter has reached 150°, the switches SW6 and SW4 close.

When the opening angle of the shutter is further increased, only the switch SW5 is open, while the switches SW3, SW4 and SW6 are closed. When the main shutter blade 71 and the first and second auxiliary shutter blades 72 and 73 just overlap and the opening angle of the shutter reaches 220°, the switches SW3 and SW6 are closed, while the switches SW4 and SW5 are open. The fade in operation is now complete.

Figure 17:
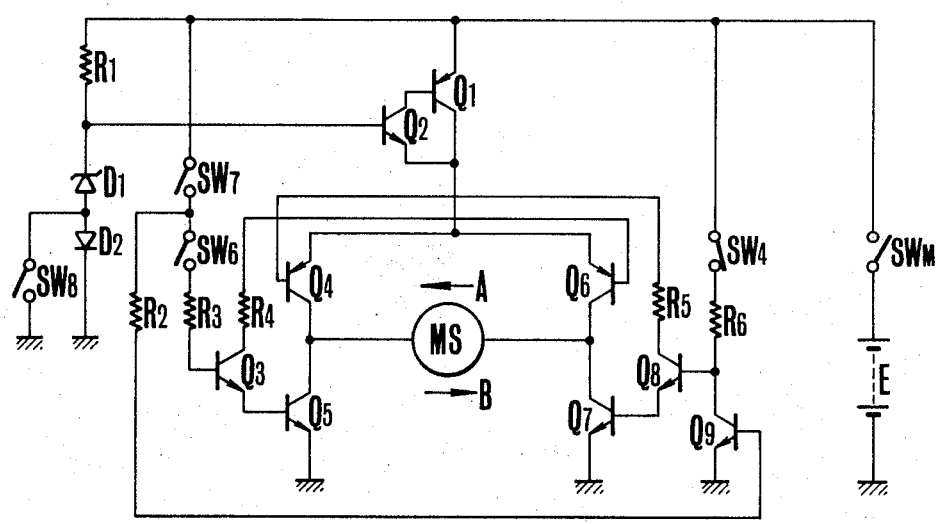
FIG. 17 shows an embodiment of the shutter opening angle control circuit shown in FIG. 3.
Figure 18:
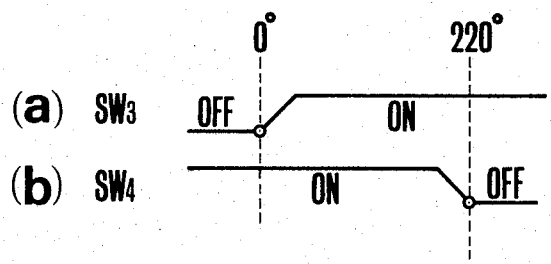
FIG. 18 shows the operation of the switch member in the above circuit.

FIG. 17 shows another embodiment of the shutter opening angle control device shown in FIG. 3. Here, a power source E and main switch $SW_M$ energize and turn on a system in which the shutter opening angle adjusting motor MS shown in FIG. 2 is controlled by a forward and backward rotation control circuit composed of transistors Q3 to Q9. Of the above, transistors Q3, Q5 and Q6 constitute the motor drive circuit for rotating the motor in the direction along which the shutter opening angle is decreased. On the other hand, transistors Q4, Q7 and Q8 form the motor drive circuit for rotating the motor along the direction along which the shutter opening angle is increased. SW7 is the normally opened switch shown in FIG. 2(a), designed so as to be closed when the knob 7a of the operation member 7 is set at the mark "C". The switch SW6, also shown in FIG. 6, is opened and closed by the projection 81b₁ provided on the cam ring 81 so that the switch SW6 is closed when the shutter opening angle is zero, i.e., the shutter is completely closed. As shown in FIG. 3, a switch SW4 is opened and closed by the projection 81c on the cam ring 81, the switch SW4 being opened when the shutter opening angle is 220°, namely, the shutter is totally opened.

A resistor R1, a Zener diode D1 and diode D2 are connected in series. Further, the connecting point of the resistor R1 with the Zener diode is connected to the base of a transistor Q2. A transistor Q1 has a base collector junction connected between the collector and emitter of the transistor Q2. The transistors Q1 and Q2, the resistor R1, the Zener diode D1 and the diode D2 form a constant voltage circuit. The constant voltage produced in the constant voltage circuit is delivered to the motor drive circuit so as always to deliver a constant voltage to the motor. A switch SW8 connected in parallel to the diode D2 is operatively engaged with the film feeding speed setting dial 8 shown in FIG. 1. The switch SW8 is closed when the dial 8 is set at the mark "18" (18 pictures per second) and opened when the dial 8 is set at the mark "24" (24 pictures per second). The potential applied to the base of the transistor Q2 when the switch SW8 is closed is lower by the voltage drop in the diode D2 than when the switch SW8 is opened. Hence, a lower voltage is applied to the motor MS when the switch SW8 is closed rather than when the switch SW8 is opened.

The first embodiment of the shutter opening angle control device of the present invention with the above circuit, operates as follows:

The fade out operation is first considered. It is assumed that the photography is carried out at the normal speed of 18 pictures per second with the shutter opening angle of 220°, namely, with the totally opened shutter. In order to carry out a fade out operation in this circumstance, the knob 7a of the fade photograph operation member is set at the mark "C". Thus, the switch SW7 is pushed down by means of the projection 7b so as to be closed. The shutter opening angle remains 220°, that is totally open until the start of the fade out operation, so that the movable contact of the switch SW4 is pushed by means of the projection on the cam ring 81, so as to close the switch SW4 while the switch SW6 is closed. Consequently, when the knob 7a of the fade photograph operation member is set at "C", the current is supplied to the base of the transistor Q3 through the switches SW7, SW6 and the resistance R3, so make the transistor Q3 conductive. This turns on the transistors Q5 and Q6. Thus, a current supply circuit for the motor MS is formed through the transistor Q6-motor MS-transistor Q5 so that the current runs through the motor MS along the direction of the arrow A. This rotates the motor MS in the direction which decreases the shutter opening angle.

As mentioned, the cam ring 81 is operatively engaged with the motor MS so as to be rotated counterclockwise in FIG. 3 with the rotation of the motor MS in order to gradually decrease the shutter opening angle. In this way, the light amount passing through the aperture 58a is gradually decreased so as to carry out a fade out operation.

When the fade out operation has been carried out in this way and the shutter opening angle has reached 0°, namely, the shutter has been totally closed, the movable contact of the switch SW6 is pushed by the projection 81b of the cam ring 81 so as to open the switch SW6 as shown in FIG. 17. Consequently, the transistor Q3 becomes non-conductive, the current supply circuit for the motor composed of the transistors Q5 and Q6 is interrupted, the motor MS stopped, and the fade out photography completed. Further, when the shutter opening angle becomes smaller than 200° during the fade out operation process, the switch SW4 whose movable contact is pushed with the projection 81c₁ of the cam ring 81 is closed so as to supply the base current to the transistor Q8. During the fade out operation, base current is supplied to the transistor Q9 through the switch SW7, so that the transistor Q9 is conductive. This keeps the transistor Q8 non-conductive. Thus, during the fade out process, the current supply circuit for the motor MS is formed only of the transistors Q5 and Q6 so that the motor MS stops at the termination of the fade out.

In the fade in operation, after the termination of fade out operation, the knob 7a of the fade photograph operation member 7 is set at the mark "0". The switch SW7 is now opened so that the transistor Q9 becomes non-conductive while the transistor Q8 conductive. This is because, as mentioned above, the switch SW4 is closed after the termination of the fade out operation, so that the base current is delivered to the transistor Q8 through the switch SW4 so as to make the transistor Q8 conductive. Thus, the transistors Q7 and Q4 become conductive and a driving current is supplied to the motor MS along the direction of the arrow B through the current supply circuit consisting of the transistor Q4-motor MS-the transistor Q7. Thus, the motor MS rotates in a direction reverse to that during the fade out operation and thereby rotates the cam ring 81 clockwise. Thus, as mentioned above, the shutter opening angle is gradually increased so as to carry out the fade in photography.

In the above way, the fade in operation is carried out until the shutter opening angle reaches 220°, namely, the shutter is opened completely. At this time, the movable contact of the switch SW4 is pushed by the projection 81c of the cam ring 81 so as to open the switch SW4. Consequently, the transistor Q8 becomes non-conductive at the termination of the fade in operation and the current supply circuit composed of the transistors Q4 and Q7 to the motor MS is interrupted so as to stop the motor MS and complete the fade in operation.

During the fade in and fade out operations, a constant voltage is applied to the motor MS, while the fade in and fade out times are constant for the same motion picture speed regardless of the fluctuation of the source voltage. Hence, the fade operation time is controlled only on the basis of the motion picture speed. If these fade in and fade out operations are carried out at the speed of 18 pictures or frames, per sec., the dial 8 has been set at the mark "18", so that the switch SW8 is closed. Consequently, a constant voltage determined by the Zener diode D1 is applied to the base of the transistor Q2, while a constant voltage V1 corresponding to the above voltage is delivered from the emitter of the transistor Q2. Thus, if the fade operation is carried out at a speed of 18 pictures per sec., a voltage approximating V1 is applied to the motor MS and the rotational speed of the motor MS is constant regardless of the fluctuation of the source voltage. Hence, the fade operation is completed in a predetermined time, for example, 5 seconds. That is to say, the fade in as well as the fade out operation is carried out in a predetermined time regardless of the fluctuation of the source voltage.

When the fade in and fade out operations are carried out at the speed of 24 pictures or frames per sec., the dial 8 has been set at the mark "24", so that the switch SW8 is open. Consequently, the voltage applied to the base of the transistors Q2 is higher than that at the speed of 18 pictures per sec. by the voltage drop in the diode D2. In this case, the potential at the emitter of the transistor Q2 is higher than that at the speed of 18 pictures per sec. by the voltage drop ($\Delta V1$) in the diode D2. That is, it is $V1+\Delta V1$. Thus, during the fade operation at the speed of 24 frames per sec. a voltage approximating $V1+\Delta V1$ is applied to the motor MS so that the rotational speed of the motor MS is higher than that at the speed of 18 pictures per sec. As a result, the fade in and fade out operations occur in a shorter time than that at the speed of 18 frames per sec., for example, 3.75 secs.

In the first embodiment of the shutter opening angle control device of the present invention, the time necessary for the fade operation does not depend upon the source voltage but is controlled only by the photographing speed. Regardless of the set motion picture speed, the number of pictures for the scene to be photographed during fading can be made to be constant at all times. When the photographing speed is 18 frames per sec., the fade operation is carried out in 5 seconds and therefore the number of pictures photographed during a fade is 90, while when the photographing speed is 24 frames per sec., the fade operation is carried out in 3.75 sec., so that the then number of pictures photographed during a fade is also 90.

In the present embodiment, the fade time is varied with the photographing speed in such a manner that the number of pictures to be photographed during a fade can be made constant at all times regardless of the photographing speed, so that a completely overlapped scene can always be photographed, regardless of the photographing speed.

Figure 19:
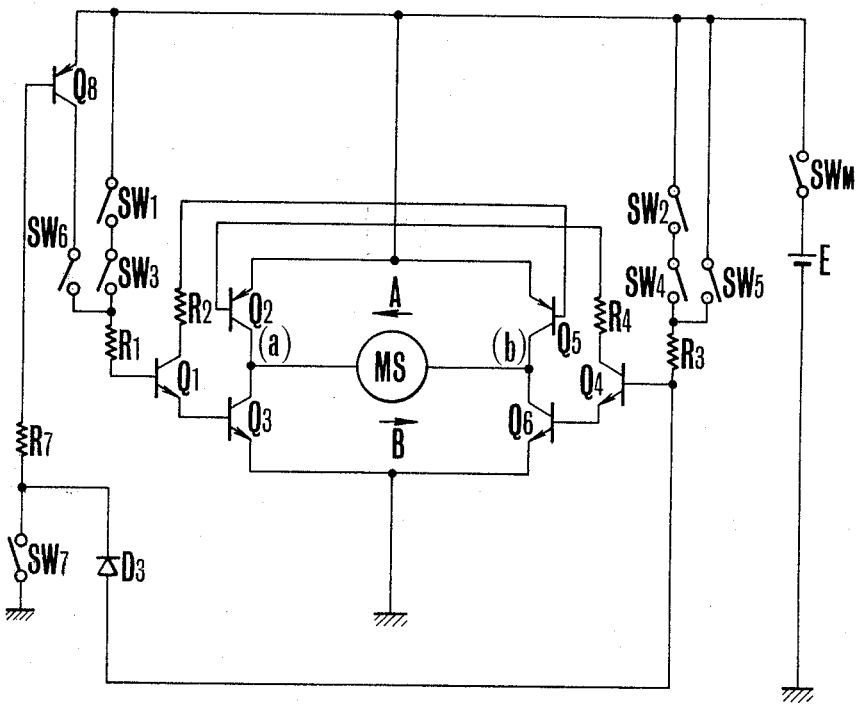
FIG. 19 shows an embodiment of the shutter opening control circuit to be applied to the shutter opening angle control device shown in FIG. 4 in accordance with the present invention.

FIG. 19 shows an example of the control circuit to be applied to the second embodiment of the shutter opening angle control device of the present invention.

Here, switches SW1 and SW2 are closed and opened by the shutter opening angle changeover operation member 6 shown in FIGS. 1 and 2. When the pointer 6b of the member 6 has been set at the index 1b so that the opening angle is 220° (the shutter is totally opened) the switch SW1 is opened and the switch SW2 is closed by the projection 6a. When the pointer 6b of the operation member 6 is set at the index 1a, so that the opening angle is 150°, the switch SW1 is closed by projection 6a and the switch SW2 is opened.

Figure 20:
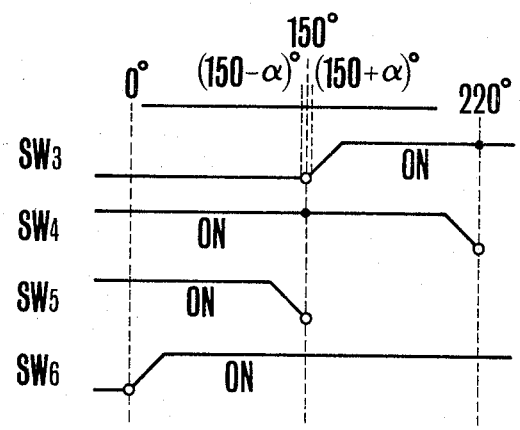
FIG. 20 shows the operation of the switch member in the above circuit.

Phase switches SW3-SW6 are controlled by the projections 81b and 81c of the cam ring 81 when the cam ring 81 is rotated in such a manner that the closed and opened states are changed in accordance with the phase of the shutter opening angle. The closed and opened states of these phase switches correspond to the phase of the shutter opening angle as shown in FIG. 20.

In FIG. 19, transistors Q1-Q6 drive the shutter opening angle control motor MS. The transistors Q1, Q3 and Q5 form a driving circuit for driving the motor MS along a direction in which the shutter opening angle is decreased. The transistors Q2, Q4 and Q6 form another driving circuit for driving the motor MS in another direction that increases the shutter opening angle. The fade switch SW7 is operatively engaged to the fade photography operation member 7 shown in FIGS. 1 and 2. The fade transistor Q8 serves for carrying out the fade operation. The circuit also includes a diode D2, resistors R1-R4 and R7, a main switch $SW_M$, and a power source E.

The operation of the shutter opening angle control device of the present invention when changing the shutter opening angle of 220° to 150°, starts with the shutter opening angle set at 220°. Then, the switches SW3 and SW6 are closed, while the switches SW4 and SW5 are opened, by being pushed up with the projection 81c of the cam ring 81. Consequently, when the pointer 6b of the operation member 6 is set at the index 1a, so as to set the opening angle at 150° as shown in FIGS. 1 and 2, the switch SW1 is closed by the projection 6a of the operation member 6 while the switch SW2 is opened. Because as mentioned, the switch SW3 is closed, current is delivered from the power source (see FIGS. 19 and 20) to the base of the transistor Q1 through the main switches $SW_M$, SW1, SW3 and the resistance R1, so as to turn on the transistor Q1. Moreover, the transistors Q5 and Q3 are also turned conductive so that the current runs through the motor MS along the direction of the arrow A through the transistors Q5 and Q3, so as to rotate the motor MS along the direction along which the shutter opening angle is decreased.

As explained, rotation of the motor MS rotates the cam ring 81 so that the slide member 76 is moved toward the first plate 58 due to the engagement of the rotary ring 80 in the cam hole so as to decrease the shutter opening angle. In this way, the shutter opening angle is decreased from 220° until the shutter opening angle reaches almost 150° (150°+$\alpha$°). At this time, the switch SW2, which is pushed up by the projection 81$b_2$, is changed from closed to open. The switches SW3 and SW5 are now open.

When the shutter opening angle is decreased almost to 150° and the switch SW3 is opened, the transistor Q1, and consequently, the transistors Q3 and Q5, are opened so as to stop the rotation of the motor MS. The shutter opening angle is thus automatically set at 150°. There is a danger that even when the shutter opening angle has reached 150°, the motor MS could not be immediately stopped for some reason (moment of inertia of the motor MS and the voltage applied) in such a manner that the shutter opening angle might be set at an angle smaller than 150°. However, the switch SW5 is changed from open to closed as soon as the shutter opening angle becomes 150°−$\alpha$°, so that the transistors Q4, Q2 and Q6 are rendered conductive and the current runs through the motor MS in the direction of the arrow B. This immediately rotates the motor MS along the direction in which the shutter opening angle is increased. In this way, the shutter opening angle returns to 150°, namely, is normally set at 150°.

The shutter opening angle is set from 150° to 220° by moving the pointer 6b of the shutter opening angle changeover operation member 6 shown in FIGS. 1 and 2 to the index 1b. The switch SW2 is now pushed by means of the projection 6a of the member 6. Thus, the switch SW1 is opened while the switch SW2 is closed. When the shutter opening angle is 150°, the switch SW4 is opened so that the current runs from the power source E to the base of the transistor Q4 through the switches $SW_M$, SW2 and SW4 and the resistor R3 so as to make the transistor Q4 conductive. In consequence, the transistors Q4, Q6 and Q2 are rendered conductive and current runs through the motor MS along the direction of the arrow B so as to rotate the motor MS along the direction along which the shutter opening angle is increased. The switch SW3 is thus closed, while the shutter opening angle is gradually increased out of 150°.

When the shutter opening angle which is increased from 150° has reached the neighborhood of 220°, the switches SW4 and SW5 are closed by means of the projection 81c of the cam ring 81. When the switch SW4 is opened, the transistor Q4 is turned off to stop the current supply to the motor MS. The shutter opening angle is automatically set at 220°, namely, the shutter is set at the totally opened state.

For the fade operation, it is assumed that the shutter opening angle is set at 220° by means of the shutter opening angle changeover operation member. Then, as mentioned above, the switch SW1 is opened, the switches SW3 and SW6 are closed and SW4 and SW5 are opened. When in this state, the knob 7a of the fade operation member 7 shown in FIGS. 1 and 2 is operated so as to be set from "0" to "C", the switch SW7 is pushed by the projection 7b and closed. Thus, the transistor Q8 is turned on, so that current is supplied to the base of the transistor Q1 through the transistor Q8 and the switch SW6 in such a manner that the current runs through the motor MS along the direction of the arrow A. The motor MS is now rotated along the direction in which the shutter opening angle is gradually decreased from 220°. In this way, when the shutter opening angle is gradually decreased from the totally opened state until the shutter is completely closed, the projection 81b of the cam ring 81 opens the switches SW3.

When the shutter has been totally closed this way, the switch VW6 is opened and the transistor Q1 is turned off so as to stop the rotation of the motor MS, by virtue of which rotation, the shutter opening angle is changed out of the totally opened state into the totally closed state. Consequently, when, during photographing, the knob 7a of the fade operation member 7 is changed over from the index "0" to "C", so as to close the switch SW7, a fade out operation is carried out.

During the process, when the shutter opening angle has passed 150°, the switches SW4 and SW5 are closed. The base of the transistor Q4 is then grounded through the diode D3 and the switch SW7. Hence, during the fade out operation, the transistor Q4 is turned off. Therefore, even when the switch SW4 is closed, the rotation direction of the motor MS is never influenced, so that the motor MS rotates along the direction along which the shutter opening angle is decreased.

When the finger is taken off the knob 7a of the fade operation member 7 after the fade out operation has been completed in this way, the knob 7a of the member 7 returns to the position corresponding to the index "0" in response to the force of the spring 4 so that the switch SW7 is opened. Thus, the transistor Q8 is turned off and, as mentioned above, the shutter opening angle has been set at 220° so that the switch SW1 is opened in such a manner that the transistor Q1 is kept off regardless of the state of the switches SW6 and SW3. On the other hand, along with the opening of the switch SW7, the transistor Q4 is no longer grounded and hence conductive. Also, the shutter is in the completely closed state at the elimination of the fading out operation so that the switches SW4 and SW5 are in the closed state. Thus, current runs through the base of the transistor Q4 through the switches SW2 and SW4, and current runs through the motor MS along the direction of the arrow B. This rotates the motor MS along the direction in which the shutter opening angle is gradually increased until the shutter opening angle reaches 220°. The switch SW4 is then opened, while the transistor Q4 is turned off so as to stop the rotation of the motor MS. Thus, the shutter is gradually brought from the totally closed state to the totally opened state so as to carry out the fade in photography.

So far, the fade in and fade out operations at the shutter opening angle between 220° and 0° have been explained. The fade in and the fade out operation at the shutter opening angle between 150° and 0° are carried out in the same way. When the shutter opening angle is set at 150°, the current runs through the base of the transistor Q1 only through the switch SW6 and the transistor Q8 when the switch SW7 is closed. Hence, the shutter opening angle is gradually decreased from 150° to 0° so as to carry out the fading out operation. When the switch SW7 is opened in this state, the current runs through the base of the transistor Q4 through the switch SW5. Thus, the shutter opening angle is gradually increased to $150°-\alpha°$. The switch SW5 is opened and the transistor Q4 is also turned off so as to stop the rotation of the motor MS.

The shutter opening angle has been set at 150° in advance by means of the member and, therefore, the switch SW1 is closed, while the switch SW2 is opened. Thus, when the shutter opening angle reaches 150° from 0°, the current supply circuit to the base of the transistor Q4 is interrupted and the shutter opening angle is fixed at 150°. In this manner, the fade in and fade out operations of 0° to 150° are carried out.

Figure 21:
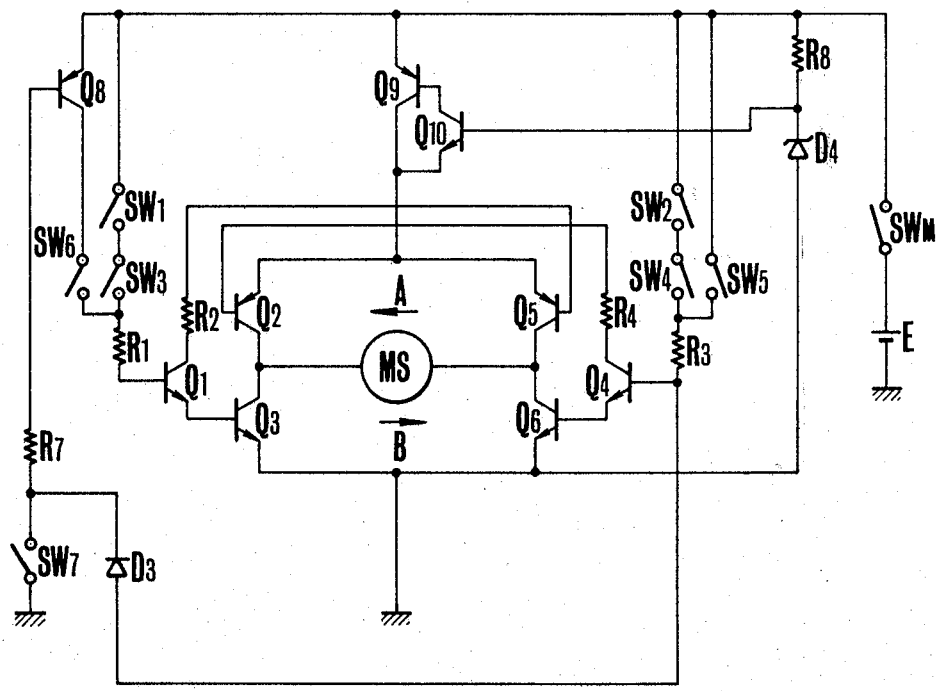

FIG. 21 shows another embodiment of the opening angle control circuit shown in FIGS. 19 and 20. Here, the members having the same figures as those in FIG. 19 are the same. What is different from the former embodiment is that the present one is provided with a constant voltage circuit composed of a Zener diode D4, a resistance R8 and the transistors Q9 and Q10 so that the voltage to be applied to the motor MS is made always constant regardless of the fluctuation of the voltage of the power source E. Therefore, the driving speed of the motor M, namely the variation speed of the shutter opening angle is constant in order that the fade out and fade in operation might be carried out in a predetermined time. The operation of the embodiment shown in FIG. 21 is the same as that of the embodiment shown in FIG. 19, so that its explanation is omitted.

FIG. 22 shows a further embodiment of the shutter opening angle control circuit. Here, the members having the same figures as those in FIG. 21 are the same members. What is different from the former embodiment is that the present one is provided with diodes D1 and D2, resistances R5 and R6 and a transistor Q7 so as to supply current to the constant voltage circuit only if needed in order to economize the power consumption. In the present embodiment, the current running through the transistors Q2 or Q5 is detected so as to turn on the transistor Q7 in order to supply the current to the constant voltage circuit. This delivers the current to the constant voltage circuit only at the driving of the motor in order to economize the power comsumption.

Figure 23:
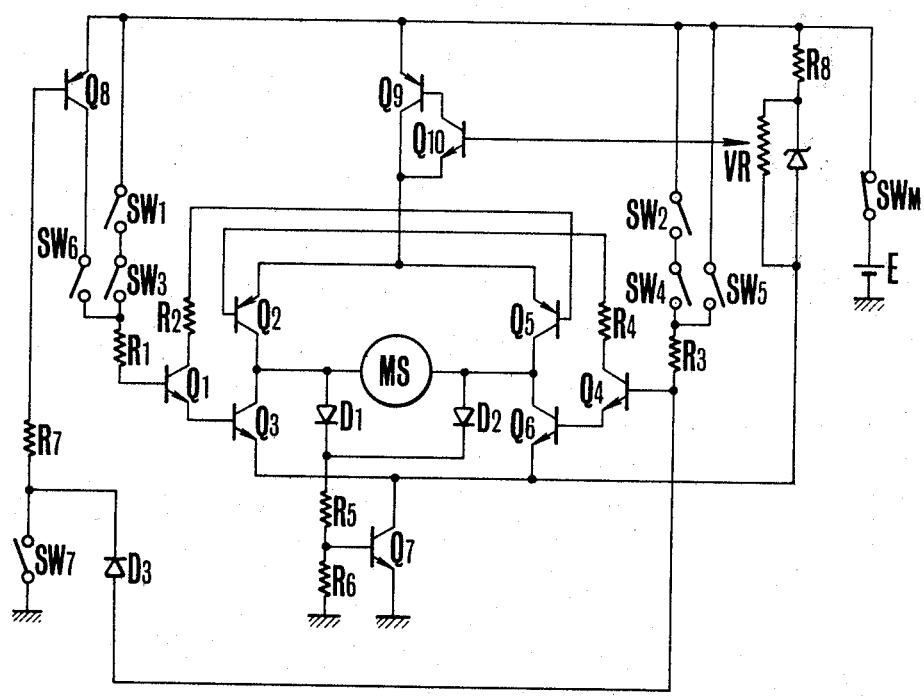

FIG. 23 shows an embodiment of the circuit in which the characteristic irregularities of the components of the constant voltage circuit such as the irregular collector current of the transistor Q9 and the irregular Zener diode D4 are compensated for. Thus, they always drive with a constant voltage in order to obtain a constant shutter opening time. A variable resistance VR is provided in parallel to the Zener diode D4 so as to compensate the output voltage of the constant voltage circuit.

Figure 24:
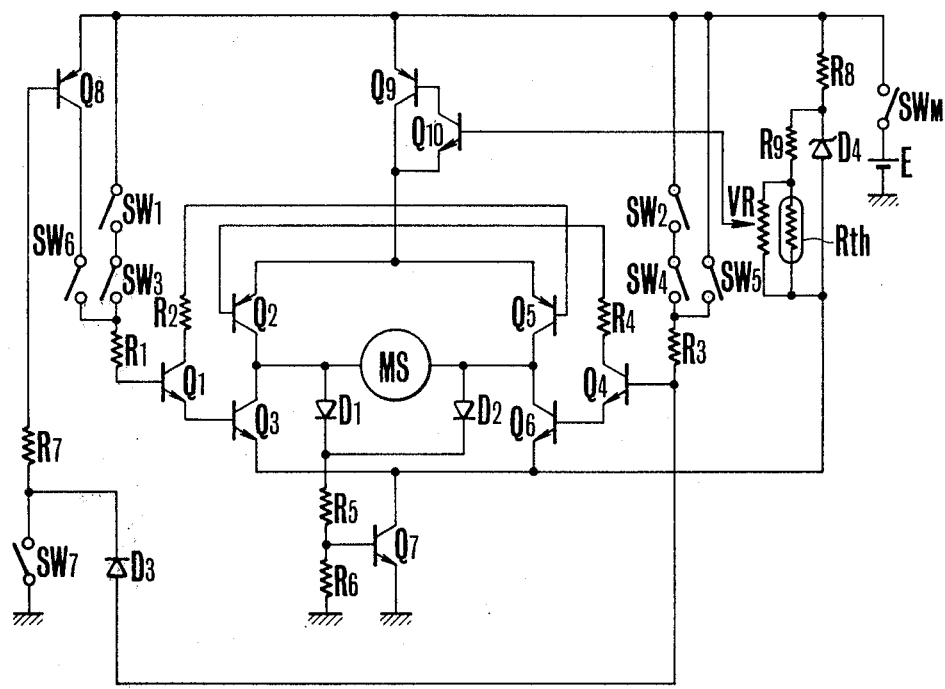

FIG. 24 shows the embodiment shown in FIG. 23, further provided with a thermister Rth so as to compensate for the temperature of the constant voltage circuit in such a manner that regardless of the increase of the load of the motor at low temperature, a constant shutter opening time can be obtained.

As explained above, the motion picture camera in accordance with the present invention is provided with a film feed device for successively feeding the film at the exposure position by means of the motor and a shutter opening angle control device for controlling the amount of exposure of the film at the exposure position by varying the relative position of more than two shutter blades to each other. The shutter opening operation of the shutter opening angle control device is carried out by means of a motor different from the one for feeding the film not in combination of the fade in and fade out operation, but also only the fade in or fade out operation can be carried out in a simple way. At the same time, the motor for carrying out the shutter opening angle control operation so as to vary the relative position of more than at least two shutter blades to each other is driven by means of the constant current circuit in order to obtain a constant shutter opening angle adjusting speed. Also, a temperature compensation circuit is provided in the constant current circuit so that a constant rotation speed of the shutter opening angle adjusting motor can be obtained in any temperature conditions in such a manner that the shutter opening angle can always be adjusted at a constant voltage. Further, in accordance with the above-mentioned construction of the present invention, the shutter opening angle can be easily and correctly changed stepwise.

While embodiments of the invention have been described in detail, it will be evident to those skilled in the art that the invention may be embodied otherwise without departing from its spirit and scope.

What is claimed is:

1. A shutter system for a motion picture camera, comprising:
 a shutter blade rotatable by a shutter driving motor, and having a portion for shielding a photographic optical path over an angular range during rotation thereof;
 a shutter opening angle control blade including at least one blade coaxially supported with said shutter blade and having a portion for shielding the optical path over in angular range for extending the range of the shielding portion of the shutter blade, the angular range of a light shielding portion of the control blade being smaller than the angular range of the light shielding portion of the shutter blade;
 driving means for driving the shutter opening angle control blade for dislocating the control blade relative to the shutter blade;
 said driving means further comprising:
  (a) an independent motor separate from the shutter driving motor;
  (b) a cam member rotatably drivable by the independent motor; and
  (c) a member coupled to the cam member for rotating the shutter opening angle control blade and shifting its rotary position relative to the shutter blade on the basis of a prescribed inter-relationship with rotation of the cam member so as to vary the angle formed by the shutter blade and the shutter opening angle control blade and vary the shielding time of the photographing optical path;
 position detecting means for detecting the rotating phase of the cam member and delivering a signal when the angle formed by the shutter opening angle control blade and the shutter blade reaches a maximum and a minimum, and at a phase corresponding to a specified intermediate angle therebetween;

instruction means for instructing a change in the opening angle of the shutter blade; and a control circuit responsive to the instruction means and the output of the position detecting means for stopping the independent motor when the opening angle of the shutter blade has reached a predetermined value.

2. A system in accordance with claim 1, wherein the control circuit includes a constant voltage circuit for supplying current to the independent motor and for maintaining the current to the independent motor so that the rotational speed of the independent motor is kept constant at a predetermined value.

3. A system in accordance with claim 2, wherein the constant voltage circuit includes selector means for selecting an output voltage on the basis of a film feed speed.

4. A system in accordance with claim 2, wherein the constant voltage circuit includes a circuit for controlling the output voltage of the constant voltage circuit and for preventing fluctuations by compensating for temperature variations.

5. A system in accordance with claim 1, wherein the cam member includes a cylindrical portion rotatable around the independent motor by the independent motor and having a cam groove and a displacement member having a projection to engage the cam groove and a member to engage the shutter blade.

6. A system in accordance with claim 5, wherein the cylindrical portion includes a first cylindrical member having a notch forming a part of the cam groove and a second cylindrical member including a notch forming the other part of the cam groove.

* * * * *